United States Patent [19]

Jackson

[11] 3,809,244

[45] May 7, 1974

[54] FUEL SEDIMENT BOWL ASSEMBLY

[75] Inventor: James Edward Jackson, Cedar Falls, Iowa

[73] Assignee: Deere & Company, Moline, Ill.

[22] Filed: Dec. 14, 1972

[21] Appl. No.: 315,147

[52] U.S. Cl. .................................................. 210/136
[51] Int. Cl. ...................................................... B01d
[58] Field of Search ............ 210/136, 84, 305, 312, 210/313, 444

[56] References Cited
UNITED STATES PATENTS
3,389,801   6/1968   Sieger ................................ 210/136
FOREIGN PATENTS OR APPLICATIONS
660,796   4/1963   Canada ................................ 182/60

Primary Examiner—Frank A. Spear, Jr.
Assistant Examiner—Ferris Lander

[57] ABSTRACT

A fuel sediment bowl assembly is located in a fuel line between a source of fuel and a fuel pump. A hand pump is formed integrally with the sediment bowl and cooperates with appropriate valving for pumping fuel into the sediment bowl when separated water in the sediment bowl is being drained therefrom, the action of the pump effecting the replacement of the volume formerly occupied by the water by fuel such that no air will be introduced into the system. The sediment bowl assembly further includes a baffle at the top thereof which is constructed so as to aid in the separation of water from the fuel being drawn through the sediment bowl by the fuel pump.

10 Claims, 3 Drawing Figures

PATENTED MAY 7 1974  3,809,244

FUEL SEDIMENT BOWL ASSEMBLY

BACKGROUND OF THE INVENTION

The present invention relates to a fuel sediment bowl assembly.

The problem of water finding its way into tractor or other vehicle fuel systems has long been in existence. Since water is heavier than fuel, most fuel systems are provided with means by which the water can be drained from the fuel system once it has separated from the fuel. Commonly, such separation is done by means of a filter incorporated in a sediment bowl assembly or the like.

When this water is drained from a known sediment bowl assembly, air is often drawn into the bowl and it occupies the space formerly occupied by the water. This air may cause air locks in the fuel lines of the system and/or may cause other disturbances in the operation of the system which will result in inadequate fuel being supplied to the engine of the vehicle. Thus, normally some way is provided for purging the air from these known systems. The known devices for purging the air from these fuel systems are not entirely satisfactory since they are somewhat inconvenient to use.

SUMMARY OF INVENTION

According to the present invention, there is provided a fuel sediment bowl assembly designed particularly for the separation of water from a fuel system.

An object of the invention is to provide a sediment bowl assembly including means for purging the water collected by the assembly from the fuel system without introducing any air into the fuel system. More particularly, it is an object of the invention to provide such a fuel sediment bowl assembly as aforedescribed wherein a hand pump forms an integral part thereof and is operative to pump in fuel to replace water being purged while the water is being purged.

A further object is to provide a sediment bowl assembly having an air bleed plug which is removable for permitting air to be purged from the assembly if air should become introduced therein as when the vehicle runs out of fuel or when fuel filters are being changed.

A further object is to provide a baffle positioned and constructed so as to aid in the separation of water from the fuel being drawn through the sediment bowl by means of the fuel pump.

These and other objects will become more apparent from the following description and the appended drawing.

DESCRIPTION OF THE PREFERRED EMBODIMENT

Figures 1, 2, 3:
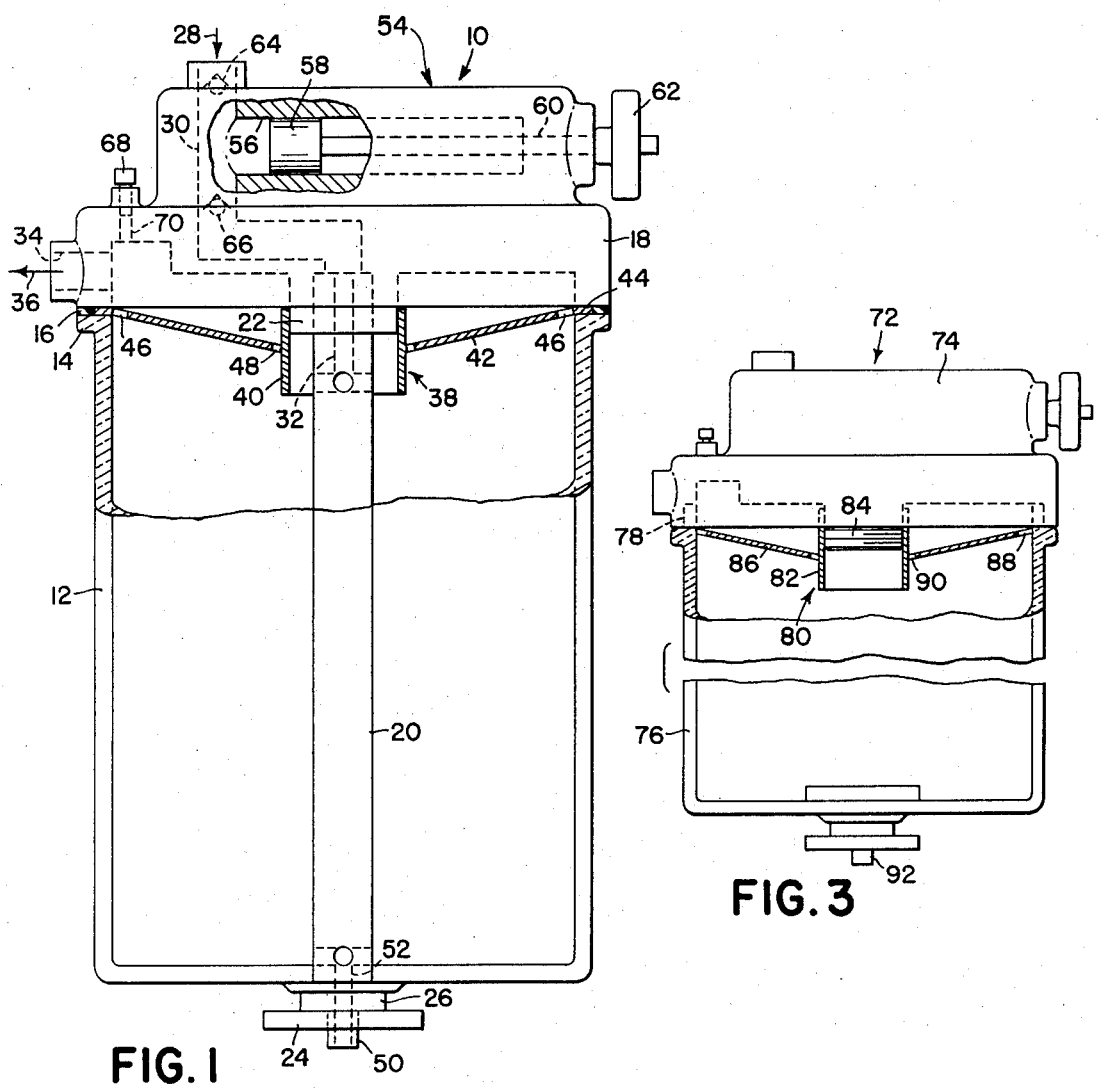
FIG. 1 is a side view of the sediment bowl assembly showing some parts broken away and other parts in transverse cross section.
FIG. 2 is a top plan view of the baffle plate of the sediment bowl assmbly of FIG. 1.
FIG. 3 is a view similar to FIG. 1 but showing an alternative mode of connectig the top of the bowl assembly to the bowl.

Referring now to FIG. 1, therein is shown a fuel sediment bowl assembly indicated in its entirety by the reference numeral 10. The bowl assembly 10 includes an open topped cylindrical bowl or container 12 of glass or other transparent material, the top of the bowl 12 defining a flange 14 on which is located an annular seal 16 which is held sandwiched between the flange 14 and a cap or head 18 by means of a center bolt 20 which extends coaxially through the bowl 12 and has its upper end threadedly received in an interiorly threaded boss 22 formed on the underside of the cap 18. The bottom end of the center bolt 20 as viewed in FIG. 1 includes a head 24 which bears against a seal 26 which prevents leakage from the bowl at the point whereat the bolt extends upwardly through the bowl.

Extending downwardly through the cap 18 between an arrow 28 indicating the direction of fuel flow into the bowl assembly 10 and the center of the threaded boss 22 is a fuel inlet passage 30. Cooperating with the passage 30 to define a fluid passage means extending into the sediment bowl 12 is a passage 32 which is located in and extends first axially downwardly from the upper end of the center bolt 20 and then branches radially to the outer surface of the center bolt. A fuel outlet passage 34 extends through the cap 18 at one side thereof. The fuel is drawn in the direction of the arrow 36 through the outlet passage 34 by means of a fuel pump (not shown) which would normally be connected to the outlet passage by means of a suitable conduit.

Extending across the top of the cylindrical bowl is a baffle member 38 which is generally circular in top plan view, as shown in FIG. 2. The baffle member 38 includes a cylindrical tubular center portion 40 which has its upper portion received about the threaded boss 22, the bottom portion of the center portion 40 being positioned to deflect fluid exiting from the radial outlets of the passage 32 in the bolt 20. A downwardly sloping funnel-like portion 42 is fixed to the center portion 40 at a location intermediate the ends thereof and extends to the top of the cylindrical bowl 12 whereat it terminates in an annular rim 44 that overlies the bowl flange 14 and is thus clamped together with the seal 16 between the cap 18 and the bowl. The funnel-like portion 42 of the baffle member is provided with outer openings 46 located adjacent the annular rim 44 for permitting fuel to flow from the bowl to the outlet passage 34 and the funnel-like portion includes a plurality of inner openings 48 located adjacent the cylindrical center portion 40. During withdrawal of fuel from the bowl 12, some of the water contained in the bottom of the bowl may be drawn up through the outer openings 46 with the fuel and as the fuel passes through the openings 46, any droplets of water in suspension will cling to the baffle plate and roll downwardly across the top surface thereof to the inner openings 48 which permit the droplets to pass back into the bowl 12.

In order to permit accumulated water to be drained from the bottom of the cylindrical bowl 12, a drain plug 50 is located centrally in the center bolt head 24 and normally plugs the lower end of a drain passage 52 formed in the lower end of the center bolt. Integrated in the cap or head 18 is a hand pump 54 which is operable to replace the volume of the water being drained from the bottom of the bowl by fuel so as to prevent the introduction of air into the fuel system when the water is being drained. Specifically, the hand pump 54 includes a bore 56 having one end opening into the fuel inlet passage 30 and containing a piston 58 to which is connected a piston rod 60 that extends to the outside of the cap 18. A combined handle and locking means 62 is secured to the piston rod for permitting an operator to turn the handle and unlock the piston to permit it to be reciprocated in the bore in order to pump fuel into the bowl. It is here noted that the piston 58 may be made of any synthetic rubber material which is not affected by fuel, the piston being mounted for tight slidable engagement with the bore so as to prevent the leakage of fuel across the piston. In order to prevent fuel from being pumped in a direction opposite to the direction of the arrow 28, a first one-way check valve 64 is located in the fuel inlet passage 30 upstream from the piston bore 56 for permitting flow only in the direction of the bore and a second one-way check valve 66 is located in the fuel inlet passage 30 downstream from the bore 56 for permitting the passage of fluid only in the direction downstream from the piston bore 56. Thus, when the piston 58 is reciprocated, fuel is drawn from the fuel supply when the piston is moved away from the inlet passage and fuel is forced into the bowl 12 when the piston is moved towards the inlet passage.

At such times that air may get into the fuel system due to running out of fuel or changing fuel filters and so forth, this air can be purged from the system with the separator pump 54. Air in the separator is purged by opening an air bleed plug 68 which normally blocks a passage 70 extending downwardly through the cap 18. Air downstream from the sediment bowl assembly 10 may be purged from the system by keeping the air bleed plug 68 closed while opening other air bleed plugs (not shown) located for example at the fuel filter and the fuel pump.

Referring now to FIG. 3, therein is shown a sediment bowl assembly which is an alternate design and is indicated in its entirety by the reference numeral 72. The sediment bowl assembly 72 is different from the bowl assembly 10 in that it includes a cap or head 74 which is secured to the top of a cylindrical bowl 76 through means of a threaded connection 78. The bowl assembly 72 further includes a baffle member 80 which serves the same function of the aforedescribed baffle member 38 but which has an interiorly threaded cylindrical tubular center portion 82 which is received on an exteriorly threaded boss 84 formed centrally on the cap 74. Connected intermediate the ends of the cylindrical center portion is a downwardly sloping funnel-like portion 86 which extends outwardly into abutting engagement with the cylindrical bowl 76 and cooperates therewith to form outer openings 88 to permit the passage of fuel from the bowl to the outlet passage in the cap. Located in the funnel-like portion 86 adjacent the cylindrical center portion 82 are a plurality of inner openings 90 for permitting the passage of water droplets in the same manner as described above with reference to the bowl assembly 10. A pet cock 92 is located in the center of the bottom of the bowl 76 and serves to permit water to be removed from the bowl.

The operation of the sediment bowl assembly 10 is as follows. Assuming that water has somehow contaminated the fuel supply on the vehicle with which the bowl assembly 10 is associated, fuel and water will enter the sediment bowl assembly through the inlet passage 30 at the arrow 28. This fuel and water mixture will pass through the inlet passage 30 and into the passage 32 in the upper portion of the center bolt and as the mixture exits from the passage 32, it will be deflected downwardly by the cylindrical center portion 40 of the baffle member 38. Since the water is heavier than the fuel, it will separate therefrom and will become distinctly visible through the transparent bowl 12. During operation, some of the separated water may be carried up from the bottom of the bowl with the fuel which is being drawn out through the outlet passage 34 by the fuel pump. This water will normally be in the form of small droplets and as these water droplets pass the restricted area formed by the outer opening 46 in the baffle member, the droplets will cling to the top of the funnel-like portion 42 and eventually grow to a size which makes them heavy enough to roll down the slope of the funnel-like portion to the inner openings 48 whereat they fall back into the bowl. This movement of the water droplets is aided by the fact that the flow of fluid into the bowl via the passage 32 will act to draw the droplets downwardly therewith.

When it is desired to remove the water from the bottom of the bowl 12, it is necessary only to remove the drain plug 50 and release the lock incorporated in the handle 62 of the hand pump 54 and then reciprocate the piston 58 through means of the handle and piston rod. This reciprocation actuates the one-way valves 64 and 66 such that fuel is drawn into the bowl 12 from the fuel tank thus forcing water out the drain passage 52 formed in the lower portion of the center bolt 20. Equal amounts of liquid are thus drawn in and forced out of the bowl 12 without introducing any air into the fuel system.

If any air should get into the fuel system as when fuel filters are being changed or when the vehicle runs out of fuel, this air can be purged from the system by actuating the pump and opening appropriate air bleed plugs such as the plug 68 to purge air from various locations in the fuel system. In addition to the area of the sediment bowl assembly, areas at which bleed plugs may be located are adjacent the fuel filters and the fuel pump.

The operation of the sediment bowl assembly 72 is similar to that of the assembly 10 and it is thought that the operation of the assembly 72 is apparent from the foregoing description.

I claim:

1. A fuel sediment bowl assembly comprising: a bowl having a bottom, an upwardly extending wall and an open top; a cap member being releasably secured in closing relationship to said top; separate fuel inlet and outlet passages extending through said cap into fluid communication with said bowl; a pump bore being located in said cap and having an inner end opening into said inlet passage between outer and inner ends thereof; a manually operable pump piston being reciprocably mounted in said pump bore; one-way valve means being located in said fuel inlet passage for normally permitting flow only in the direction from the outer to the inner end of said inlet passage and for permitting fluid to pass into the pump bore only from the direction of the inlet passage outer end when the piston is moved away from the bore inner end and for permitting flow out of the pump bore only in the direction of the inlet passage inner end when the pump piston is moved toward the inner end of the bore for effecting an operation when the pump piston is reciprocated whereby fuel is transferred only in the direction of said bowl; a drain passage means extending through the bottom of said bowl; a drain plug means being removably received in said drain passage means; a baffle member means for aiding in the separation of water from fuel entering the bowl; said baffle member means including a central tubular portion providing a passage for fluid to flow into the sediment bowl from the inlet passage; a funnel-like portion joined to the tubular portion and extending to the wall of the bowl; first passage means located in said funnel-like portion adjacent said wall for permitting the flow of fluid from the bowl to the outlet passage and second passage means for permitting the passage of water droplets that may cling to the top of the funnel-like portion at said first passage means and gravitate to the second passage means.

2. The sediment bowl assembly defined in claim 1 wherein said cap member includes a centrally located threaded boss disposed inside said bowl and having the inner end of said inlet passage located therein; and said boss and tubular portion of said baffle member means being threadedly interengaged.

3. The sediment bowl assembly defined in claim 1 wherein the periphery of said funnel-like portion overlies the top of said bowl; a center bolt extending vertically through the bottom of said bowl and having a threaded upper end threadedly received in said boss and containing a fluid passage forming a portion of said inlet fuel passage means; said center bolt including a head located below the bowl whereby tightening of the bolt will draw the cap and bowl top together to sandwich the peripheral portion of said baffle member means.

4. The sediment bowl assembly defined in claim 3 wherein said drain passage and plug means located in the bottom portion and head of said center bolt.

5. The fuel sediment bowl assembly defined in claim 1 wherein an air bleed passage extends through said cap and a plug being received in said air bleed passage.

6. The fuel sediment bowl assembly defined in claim 1 wherein the top of said bowl and said cap are threadedly interengaged.

7. A fuel sediment bowl assembly comprising: a bowl having an open top; a cap member; connecting means releasably securing said cap member in a position covering the open top of said bowl; separate fluid inlet and outlet passages extending through said cap and having respective outer ends opening at the exterior of the assembly and having respective inner ends opening into said bowl respectively at locations centrally of and to one side of said open top; a baffle plate secured to one of said bowl and cap member in a position beneath and adjacent to said cap member; said baffle plate having outer peripheral portions extending about the inner perimeter of the bowl adjacent the top thereof and having a central portion located at a level below the peripheral portion and connected thereto through means of a planar connecting portion whereby the baffle plate inclines downwardly towards its center; said baffle plate having first fluid passage means in the peripheral portion thereof, for permitting the passage of fuel from the bowl to the fuel outlet passage, and having second fluid passage means in the central portion thereof for permitting fuel to flow into the bowl from said fuel inlet passage and for permitting any water droplets which might find their way to the top of the baffle plate to pass back into the lower part of the bowl; a drain valve means being located in the bottom of the bowl for draining water therefrom which has separated from the fuel; said cap member defining a pump bore being in fluid communication with said fuel inlet passage at a location between the outer and inner ends thereof; a manually operable pump piston being reciprocably mounted in said bore; and one-way valve means being located in said fuel inlet passage for normally permitting flow only in the direction from the outer to the inner end of the inlet passage, permitting flow only from the inner end of the inlet passage to the pump bore when the pump piston is moved away from said location of the inlet passage and for permitting flow only from the bore in the direction of the inner end of the inlet passage when the pump piston is moved toward said location of the inlet passage for effecting a pump operation whereby fuel is transferred only in the direction of said bowl during reciprocation of the pump piston.

8. The fuel sediment bowl assembly defined in claim 7 wherein an air bleed passage extends through said cap and a plug being removably inserted in said bleed passage.

9. The fuel sediment bowl assembly defined in claim 7 wherein said connecting means comprises a center bolt extending centrally through the bottom of said bowl; said fuel inlet passage means including a threaded portion extending centrally into the open top of said bowl and said center bolt having an upper end portion threadedly received in said threaded portion; said bolt having upper end portion passage means therein fluid connecting the fuel inlet passage means with said bowl and said central portion of the baffle plate including a vertically extending deflector portion surrounding the upper end portion of said bolt.

10. The fuel sediment bowl assembly defined in claim 7 wherein said connecting means comprises a threaded skirt on said cap member and the top portion of said bowl being threaded and threadedly received on said skirt.

* * * * *